US 9,158,956 B2

(12) United States Patent
Tonouchi et al.

(10) Patent No.: US 9,158,956 B2
(45) Date of Patent: Oct. 13, 2015

(54) READER, READING METHOD AND COMPUTER PROGRAM PRODUCT

(71) Applicant: KABUSHIKI KAISHA TOSHIBA, Tokyo (JP)

(72) Inventors: Yojiro Tonouchi, Tokyo (JP); Sachi Minami, Kanagawa (JP); Masashi Nishiyama, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/670,621

(22) Filed: Nov. 7, 2012

(65) Prior Publication Data
US 2013/0306733 A1      Nov. 21, 2013

(30) Foreign Application Priority Data

Nov. 8, 2011      (JP) .................................. 2011-244642

(51) Int. Cl.
*G06K 9/00*      (2006.01)
*G06K 7/14*      (2006.01)
(52) U.S. Cl.
CPC ..................................... *G06K 7/1491* (2013.01)
(58) Field of Classification Search
CPC ........................... G06K 7/1491; G06K 7/1443
USPC ........................ 235/462.08–462.12
See application file for complete search history.

(56) References Cited

U.S. PATENT DOCUMENTS

| | | | | |
|---|---|---|---|---|
| 5,929,421 A | * | 7/1999 | Cherry et al. | 235/462.12 |
| 6,073,847 A | * | 6/2000 | Reichenbach et al. | 235/462.12 |
| 2008/0245871 A1 | * | 10/2008 | Sato et al. | 235/462.12 |

FOREIGN PATENT DOCUMENTS

| | | |
|---|---|---|
| CN | 101882206 | 11/2010 |
| CN | 101882212 | 11/2010 |
| JP | 2002-150213 | 5/2002 |
| JP | 2005-164655 | 6/2005 |

OTHER PUBLICATIONS

Office Action mailed Mar. 31, 2015 in counterpart Chinese Application No. 201210441262.2 and English-language translation thereof.
Office Action mailed Aug. 5, 2014 in counterpart JP Application No. 2011-244642 and English-language translation thereof.

* cited by examiner

*Primary Examiner* — Daniel St Cyr
(74) *Attorney, Agent, or Firm* — Nixon & Vanderhye, P.C.

(57) ABSTRACT

According to an embodiment, a reader includes an acquiring unit configured to acquire an image containing a code; a detecting unit configured to detect a plurality of local regions containing parts of the code from the image; an integrating unit configured to integrate the local regions to obtain an integrated region; and a reading unit configured to read the code on the integrated region.

11 Claims, 8 Drawing Sheets

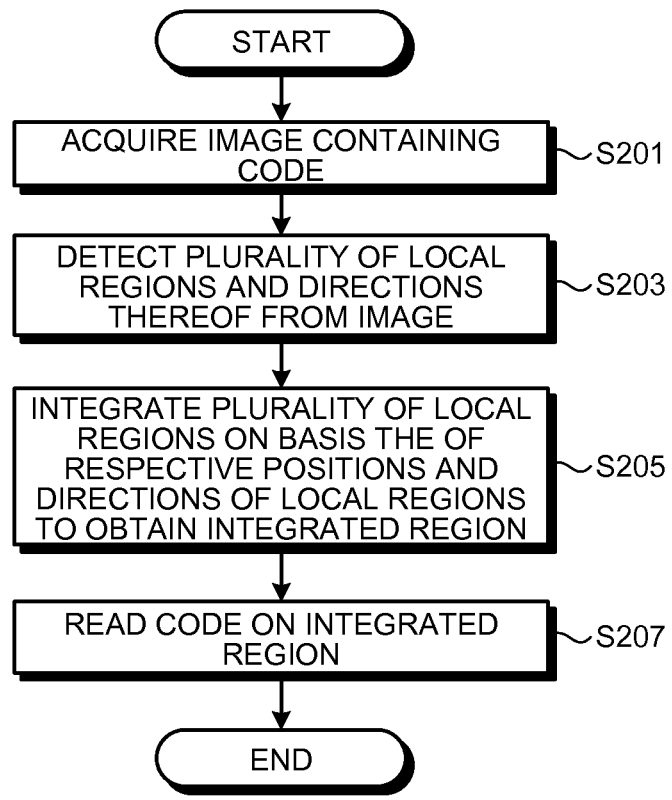
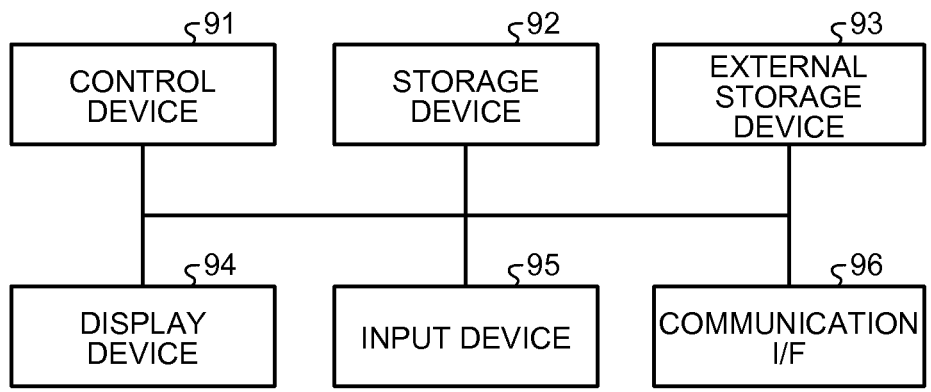

READER, READING METHOD AND COMPUTER PROGRAM PRODUCT

CROSS-REFERENCE TO RELATED APPLICATIONS

This application is based upon and claims the benefit of priority from Japanese Patent Application No. 2011-244642, filed on Nov. 8, 2011; the entire contents of which are incorporated herein by reference.

FIELD

Embodiments described herein relate generally to a reader, a reading method and a computer program product.

BACKGROUND

Various codes such as bar codes are used for writing information on management of articles in a wide range of fields such as merchandise sales, distribution, and production processes. For reading such codes, a hand scanner or a pen scanner that directly points a code to read the code, a stationary scanner that emits beams in a plurality of directions to read a code with any of the beams, or the like is used.

With the related art as described above, however, when a code is printed on or attached to a deformable object, the code will be distorted as the object is deformed and therefore may not be readable.

BRIEF DESCRIPTION OF THE DRAWINGS

FIG. 15 is a flowchart illustrating an example of a reading process according to the second embodiment; and FIG. 16 is a block diagram illustrating an exemplary hardware configuration of the reader according to the first and second embodiments.

DETAILED DESCRIPTION

According to an embodiment, a reader includes an acquiring unit configured to acquire an image containing a code; a detecting unit configured to detect a plurality of local regions containing parts of the code from the image; an integrating unit configured to integrate the local regions to obtain an integrated region; and a reading unit configured to read the code on the integrated region.

Embodiments will be described below in detail with reference to the accompanying drawings.

First Embodiment

Figure 1:
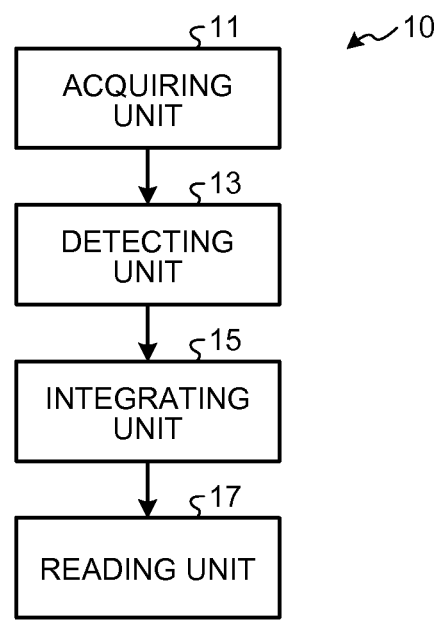
FIG. 1 is a configuration diagram illustrating an example of a reader according to a first embodiment.

FIG. 1 is a configuration diagram illustrating an example of a reader 10 according to a first embodiment. As illustrated in FIG. 1, the reader 10 includes an acquiring unit 11, a detecting unit 13, an integrating unit 15 and a reading unit 17. The respective units of the reader 10 may be implemented by making a processor such as a central processing unit (CPU) execute a program, that is, by software, may be implemented by hardware such as an integrated circuit (IC), or may be implemented by combination of software and hardware.

The acquiring unit 11 acquires an image captured by an image input unit (not illustrated). The image input unit can be implemented by an imaging device such as a digital camera and inputs a captured image. In the first embodiment, an image captured by the image input unit, that is, an image acquired by the acquiring unit 11 is assumed to be an image obtained by capturing a code printed on or attached to a deformable object such as a bendable object. In the first embodiment, the acquiring unit 11 thus acquires an image containing a code. If the image input unit captures a code that is distorted as the object is deformed, the code in the image acquired by the acquiring unit 11 will also be distorted as a matter of course.

A code according to the first embodiment is a code that can be optically recognized, and a pattern in which similar patterns are locally repetitively arranged is used therefor. Specifically, a pattern in which patterns in a first direction are different and patterns in a second direction perpendicular to the first direction are uniform is used for a code in the first embodiment. In the first embodiment, the first direction is assumed to be a main axis direction of an object on or to which the code is printed or attached, and the first direction will be hereinafter referred to as the main axis direction of the code. The main axis of an object corresponds to the central axis in the longitudinal direction of the object, for example, and the main axis of a code corresponds to the central axis in the main axis direction (first direction) of the code, for example.

Figure 2:
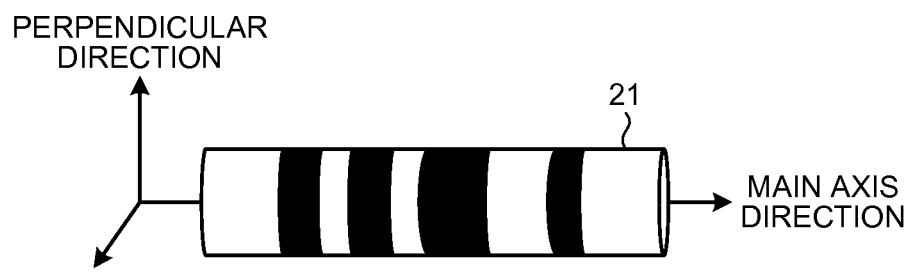
FIG. 2 is a diagram illustrating an example of a code according to the first embodiment.

FIG. 2 is a diagram illustrating an example of a code 21 according to the first embodiment. In the example illustrated in FIG. 2, the code 21 is a one-dimensional bar code in which a pattern of black and white stripes is used in the main axis direction of the code 21. The code 21 is assumed to be printed on a cable (not illustrated) and thus illustrated in a cylindrical shape in the example of FIG. 2. However, the shape of the code 21 is not limited thereto. Furthermore, in the example illustrated in FIG. 2, the code 21 is assumed to be printed on a cable so that the main axis direction of the code 21 and the main axis direction of the cable coincide with each other.

The detecting unit 13 detects a plurality of local regions each containing a part of the code from the image acquired by the acquiring unit 11. Specifically, the detecting unit 13 uses a detector for which a local region containing a pattern that is a part of a code (pattern) is an object to detect so as to detect a plurality of local regions from the image acquired by the acquiring unit 11. This detector can be generated by performing machine learning in advance using a large number of sample images containing patterns to be detected.

Figure 3:
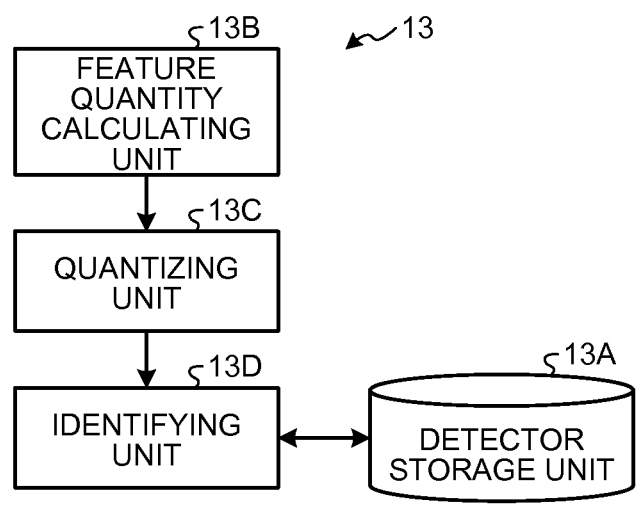
FIG. 3 is a configuration diagram illustrating a detailed example of a detecting unit according to the first embodiment.

FIG. 3 is a configuration diagram illustrating an example of details of the detecting unit 13 according to the first embodiment. As illustrated in FIG. 3, the detecting unit 13 includes a detector storage unit 13A, a feature quantity calculating unit 13B, a quantizing unit 13C and an identifying unit 13D.

The detector storage unit 13A stores a detector that has a plurality of combinations selected in advance, each of which being a combination of a feature region containing a plurality of pixel regions and a quantized learned feature quantity obtained by quantizing a learned feature quantity that is a feature quantity of the feature region in a sample image, and also has information indicating whether or not a sample image is an object to be detected. The detector can be obtained by learning about the sample images in advance.

The feature quantity calculating unit 13B calculates an input feature quantity that is a feature quantity of a region corresponding to each of the feature regions belonging to the combinations in the image acquired by the acquiring unit 11 by obtaining a weighted sum of pixel regions of the feature region, the pixel regions being weighted with different weights from one another, or an absolute value of the weighted sum.

The quantizing unit 13C quantizes the input feature quantity calculated by the feature quantity calculating unit 13B to obtain a quantized input feature quantity.

The identifying unit 13D applies the quantized input feature quantity obtained by the quantizing unit 13C to the detector stored in the detector storage unit 13A to identify whether or not an object (local region) to be detected is contained in the image acquired by the acquiring unit 11.

Figure 4:
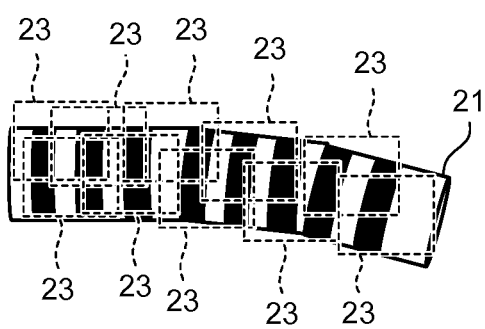
FIG. 4 is a diagram illustrating an example of a plurality of local regions detected by the detecting unit according to the first embodiment.

FIG. 4 is a diagram illustrating an example of a plurality of local regions 23 detected by the detecting unit 13 according to the first embodiment. It is assumed, for example, that the code in the image acquired by the acquiring unit 11 is a one-dimensional code in which a pattern of black and white stripes is used in the main axis direction of the code 21 as the code 21 illustrated in FIG. 2. In this case, the detecting unit 13 uses a detector for which a local region containing several black and white patterns is an object to detect so as to detect a plurality of local regions 23 containing several black and white patterns from the image acquired by the acquiring unit 11 as illustrated in FIG. 4. This detector can be generated by performing machine learning in advance using a large number of sample images containing several black and white patterns. The sample images for machine learning may be real images obtained by actually capturing images or may be artificial images created by computer graphics. Note that, in the example illustrated in FIG. 4, the code 21 in the image acquired by the acquiring unit 11 is distorted (the main axis of the code 21 is bent), which is because the cable (not illustrated) on which the code 21 is printed is bent.

The integrating unit 15 integrates the local regions detected by the detecting unit 13 to obtain an integrated region. Specifically, the integrating unit 15 integrates the local regions according to positions of the local regions detected by the detecting unit 13 to obtain one or more integrated regions. For example, the integrating unit 15 calculates a distance between local regions for each of the local regions detected by the detecting unit 13 by using the position of the local region and the position of another local region, and integrates local regions with the distance therebetween being smaller than a threshold to obtain one or more integrated regions.

While the integrating unit 15 in the first embodiment calculates, for each of a plurality of local regions, distances between the local region and the other local regions and integrates local regions with the calculated distance therebetween being smaller than the threshold, the integrating unit 15 is not limited thereto. For example, the integrating unit 15 may calculate, for each of a plurality of local regions, distances between a local region and local regions adjacent thereto and integrate local regions with the calculated distance therebetween being smaller than a threshold.

While the integrating unit 15 in the first embodiment integrates local regions by means of hierarchical clustering based on center-to-center distances between local regions, the method for integrating local regions is not limited thereto. For example, it is assumed that two-dimensional coordinates of the center position of one local region are (x(1), y(1)) and two-dimensional coordinates of the center position of another local region are (x(2), y(2)). In this case, the integrating unit 15 expresses the distance between the one local region and the other local region by a square distance D by using an equation (1).

$$D(x(1),y(1),x(2),y(2))=(x(1)-x(2))^2+(y(1)-y(2))^2 \qquad (1)$$

The integrating unit 15 then integrates the local regions if the calculated square distance D (the distance between the local regions) is smaller than a threshold but does not integrate the local regions if the square distance D is equal to or larger than the threshold.

Figure 5:
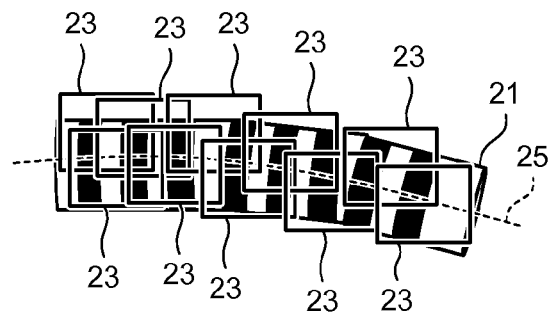
FIG. 5 is a diagram illustrating an example of an integrated region obtained by an integrating unit according to the first embodiment.
Figure 6:
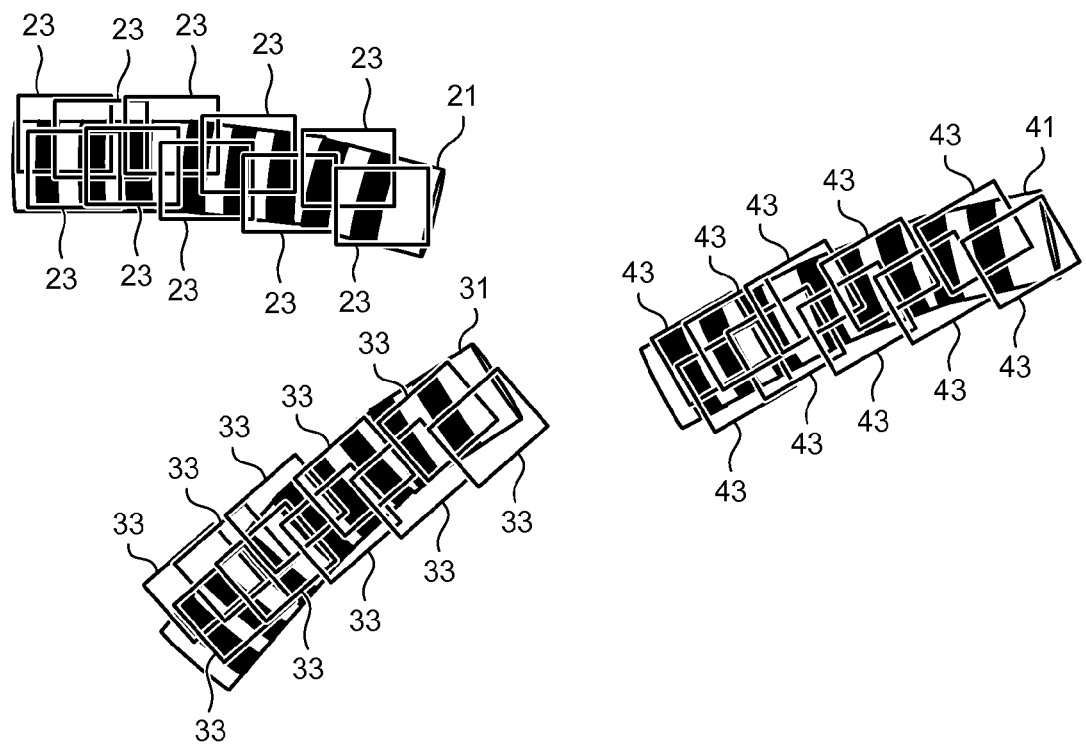
FIG. 6 is a diagram illustrating an example of integrated regions obtained by the integrating unit according to the first embodiment.

FIGS. 5 and 6 are diagrams illustrating examples of integrated regions obtained by the integrating unit 15 according to the first embodiment. In the example illustrated in FIG. 5, since one code 21 is contained in the image acquired by the acquiring unit 11, the integrating unit 15 integrates a plurality of local regions 23 to obtain one integrated region. In the example illustrated in FIG. 6, on the other hand, since three codes 21, 31 and 41 are contained in the image acquired by the acquiring unit 11, the integrating unit 15 obtains three integrated regions, which are an integrated region obtained by integrating a plurality of local regions 23, an integrated region obtained by integrating a plurality of local regions 33 and an integrated region obtained by integrating a plurality of local regions 43. As described above, in the first embodiment, integration of local regions of different codes can be avoided and different codes can be obtained as separate codes. This is because the integrating unit 15 integrates local regions with the distance therebetween being smaller than a threshold but does not integrate local regions with the distance therebetween being equal to or larger than the threshold.

The integrating unit 15 also calculates the main axis of an integrated region (code) on the basis of the positions of the local regions detected by the detecting unit 13. While the integrating unit 15 in the first embodiment calculates, as the main axis, a quadratic curve fit to center positions of the local regions integrated into an integrated region, the method for calculating the main axis is not limited thereto.

For example, each of the center positions of the local regions integrated into an integrated regions is represented by $(x(i), y(i))$ and a quadratic curve representing the main axis is expressed as $y=ax^2+bx+c$, where $i=1, 2, \ldots, N$, N being the number of local regions integrated into an integrated region.

In this case, the integrating unit 15 calculates the quadratic curve y=ax²+bx+c representing the main axis of the integrated region by obtaining the variables a, b and c that minimize a function f(a, b, c) expressed by an equation (2).

$$f(a, b, c) = \sum_{i=1}^{N} \{y(i) - (ax(i)^2 + bx(i) + c)\}^2 \quad (2)$$

In this manner, the integrating unit 15 calculates a main axis 25 of the integrated region (code 21) into which the local regions 23 are integrated as in the example illustrated in FIG. 5.

The reading unit 17 reads the integrated region obtained by the integrating unit 15. Specifically, the reading unit 17 reads the code on the integrated region obtained by the integrating unit 15 in the main axis direction calculated by the integrating unit 15. For example, the reading unit 17 recognizes the pattern (cod pattern) of an integrated region obtained by the integrating unit 15 and decodes the code.

Figure 7:
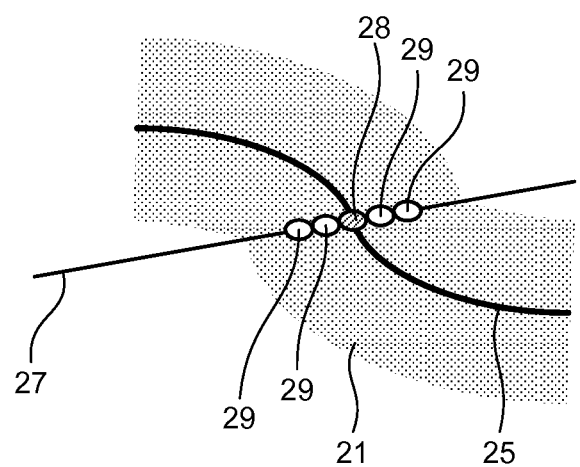
FIG. 7 is an explanatory diagram illustrating an example of a reading method of a reading unit according to the first embodiment.
Figure 8:
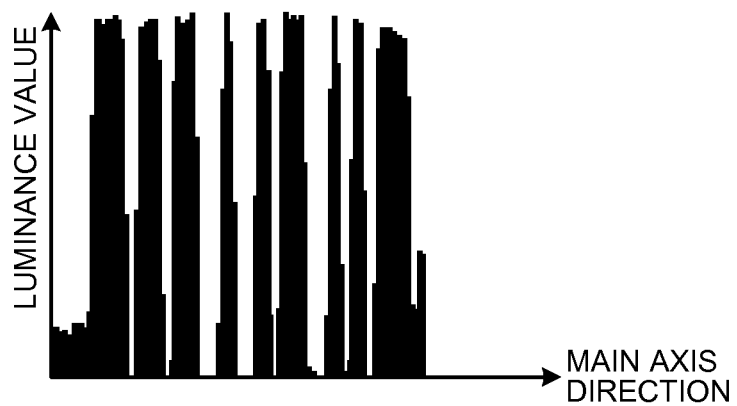
FIG. 8 is an explanatory diagram illustrating the example of the reading method of the reading unit according to the first embodiment.

FIGS. 7 to 10 are explanatory diagrams illustrating an example of the reading method of the reading unit 17 according to the first embodiment. First, as illustrated in FIG. 7, the reading unit 17 calculates a normal 27 at a point (pixel) 28 on the main axis 25 calculated by the integrating unit 15 and adds up luminance values at five points (the point 28 and points 29), in which the point 28 is at the center, among points (pixels) on the normal 27. While the number of points on the normal 27 for adding up the luminance values is five in the first embodiment, the number of points on the normal 27 for adding up the luminance values is not limited thereto.

Figure 9:
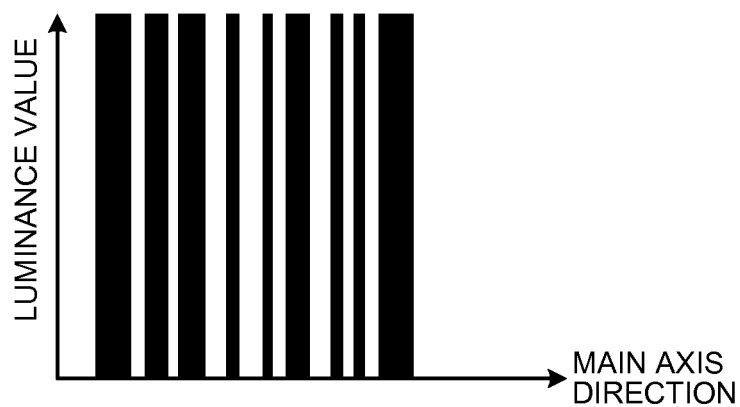
FIG. 9 is an explanatory diagram illustrating the example of the reading method of the reading unit according to the first embodiment.

The reading unit 17 performs this process for each point on the main axis 25 to create a histogram (see FIG. 8) in which the main axis is represented by the horizontal axis and the pixel values are represented by the vertical axis, and binarizes the histogram (see FIG. 9).

Figure 10:
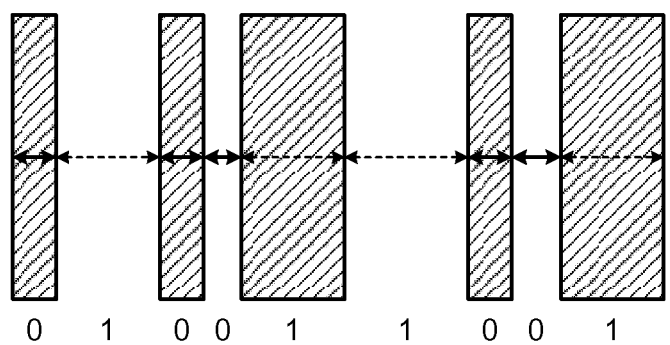
FIG. 10 is an explanatory diagram illustrating the example of the reading method of the reading unit according to the first embodiment.

The reading unit 17 then uses the binarized histogram to calculate a width of each of white and black stripes in the main axis direction, and sets 1 if the calculated width is larger than a threshold or sets 0 if the calculated width is smaller than the threshold (see FIG. 10). In this manner, the reading unit 17 can recognize the pattern of the integrated region obtained by the integrating unit 15 and decodes the code.

Figure 11:
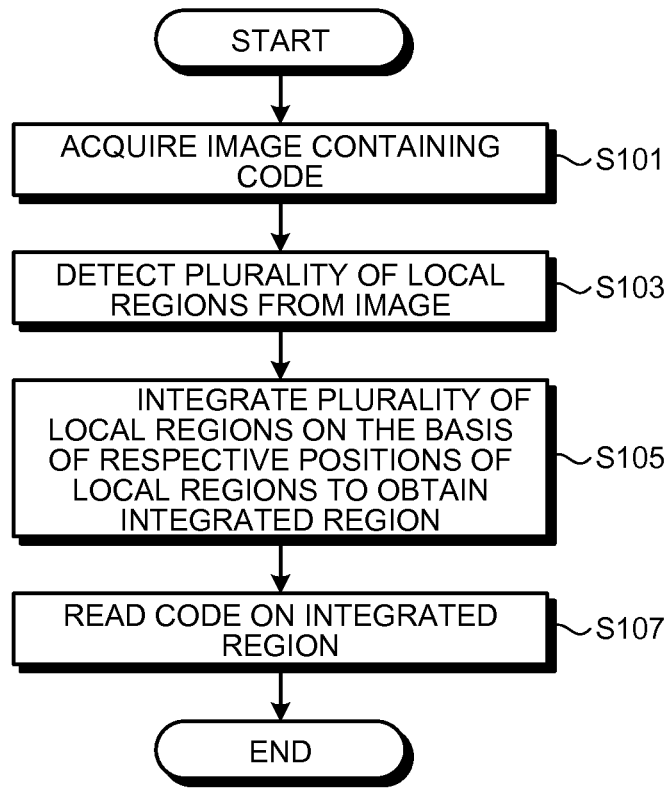
FIG. 11 is a flowchart illustrating an example of a reading process according to the first embodiment.

FIG. 11 is a flowchart illustrating an example of a flow of procedures of a reading process performed by the reader 10 according to the first embodiment.

First, the acquiring unit 11 acquires an image containing a code from the image input unit (step S101).

Subsequently, the detecting unit 13 detects a plurality of local regions containing parts of the code from the image acquired by the acquiring unit 11 (step S103).

Subsequently, the integrating unit 15 integrates the local regions detected by the detecting unit 13 on the basis of the respective positions thereof to obtain an integrated region (step S105).

Subsequently, the reading unit 17 reads the code on the integrated region obtained by the integrating unit 15 (step S107).

As described above, in the first embodiment, a plurality of local regions containing parts of a code are detected from an image containing the code and integrated into an integrated region and the integrated region is read by utilizing the fact that the local shapes of the code change little even when the code is distorted as the main axis of an object on or to which the code is printed or attached is bent or the like. According to the first embodiment, a code can be read even if the code is distorted.

In addition, according to the first embodiment, since local regions with the distance therebetween being smaller than a threshold are integrated but local regions with the distance therebetween being equal to or larger than the threshold are not integrated, it is possible to avoid integrating local regions of different codes and obtain different codes as separate codes.

Moreover, in the first embodiment, a code using a pattern in which patterns in the main axis direction are different and patterns in the direction perpendicular to the main axis direction are uniform is used. According to the first embodiment, since the patterns of the code in the direction perpendicular to the main axis direction are uniform as described above, the code can be read even in a case where the code is printed on or attached to a surface that is not flat and part of the code is hidden in the perpendicular direction.

Furthermore, in the first embodiment, various costs (labor, etc.) for creating sample images can be reduced by performing machine learning using artificial images created by computer graphics as sample images to generate the detector.

Second Embodiment

In the second embodiment, an example of integration of local regions taking the directions of the local regions into account will be described. In the following, the difference from the first embodiment will be mainly described and components having similar functions as in the first embodiment will be designated by the same names and reference numerals as in the first embodiment, and the description thereof will not be repeated.

Figure 12:
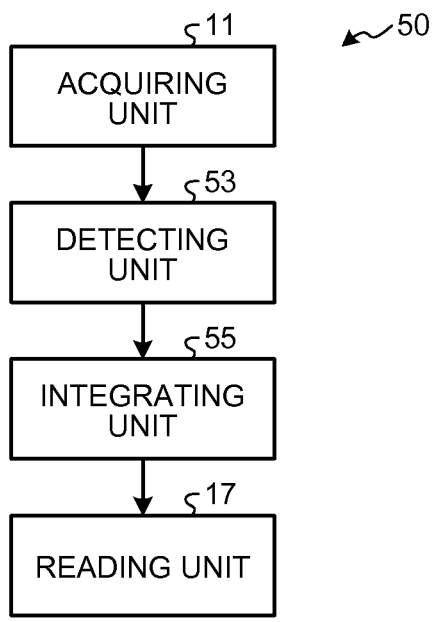
FIG. 12 is a configuration diagram illustrating an example of a reader according to a second embodiment.

FIG. 12 is a configuration diagram illustrating an example of a reader 50 according to the second embodiment. As illustrated in FIG. 12, the reader 50 of the second embodiment is different from the reader 10 of the first embodiment in a detecting unit 53 and an integrating unit 55.

The detecting unit 53 further detects the directions of the respective detected local regions. Specifically, the detecting unit 53 uses a detector for which a local region containing a pattern that is a part of a code (pattern) and the direction of which is defined is an object to detect so as to detect the local regions and the directions thereof from the image acquired by the acquiring unit 11.

Figure 13:
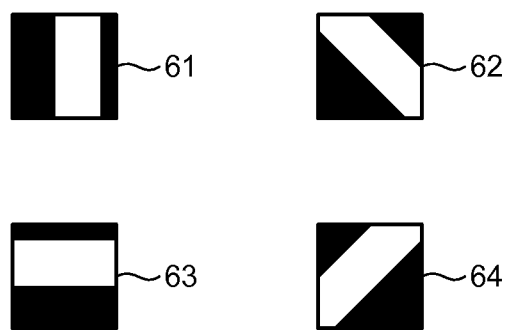
FIG. 13 is a diagram illustrating examples of objects to be detected by a detecting unit according to the second embodiment.

FIG. 13 is a diagram illustrating examples of objects (local regions) to be detected by the detecting unit 53 according to the second embodiment. In the example illustrated in FIG. 13, a local region 61 in which black and white stripes are oriented in a direction of 0 degrees, a local region 62 in which black and white stripes are oriented in a direction of 45 degrees, a local region 63 in which black and white stripes are oriented in a direction of 90 degrees, and a local region 64 in which black and white stripes are oriented in a direction of 135 degrees are illustrated as the objects to be detected. In this case, the detecting unit 53 uses four detectors, which are a detector for which the local region 61 is an object to be detected, a detector for which the local region 62 is an object to be detected, a detector for which the local region 63 is an object to be detected, and a detector for which the local region 64 is an object to be detected, to detect not only the local regions but also the directions thereof (0 degrees, 45 degrees, 90 degrees and 135 degrees) from the image acquired by the acquiring unit 11.

The integrating unit 55 integrates the local regions according to the positions and the directions of the local regions detected by the detecting unit 53 to obtain one or more integrated regions. For example, for each of the local regions detected by the detecting unit 53, the integrating unit 55 calculates a first distance between local regions by using the position of a local region and the position of another local region and also calculates a second distance between local regions by using the direction of a local region and the direction of another local region. The integrating unit 55 then integrates local regions with a value based on the first distance and the second distance being smaller than a threshold to obtain one or more integrated regions.

While the integrating unit 55 in the second embodiment integrates local regions by means of hierarchical clustering based on center-to-center distances and differences in direction (angular differences) between local regions, the method for integrating local regions is not limited thereto. For example, the integrating unit 55 generates a three-dimensional vector (x, y, d) from two-dimensional coordinates (x, y) of center positions of the local regions and the directions (angles) d of the local regions, and performs clustering on the basis of a certain distance scale using the three-dimensional vector. The distance may be a Euclidean distance or a square distance treating three elements, that is, the two-dimensional coordinates and the distance (angle) equally, or may be a sum of the distance of the two-dimensional coordinates and the distance of the directions (angles) that are calculated by using different distance scales.

For example, it is assumed that the center position and the direction of one local region are (x(1), y(1), d(1)) and the center position and the direction of another local region are (x(2), y(2), d(2)). In this case, the integrating unit 55 expresses the distance between the one local region and the other local region by a square distance D by using an equation (3).

$$D(x(1),y(1),d(1),x(2),y(2),d(2))=D1(x(1),y(1),x(2),y(2))+D2(d(1),d(2)) \quad (3)$$

In the equation, D1(x(1),y(1),x(2),y(2)) and D2(d(1), d(2)) are obtained by using equations (4) and (5), respectively.

$$D1(x(1),y(1),x(2),y(2))=(x(1)-x(2))^2+(y(1)-y(2))^2 \quad (4)$$

$$D2(d(1),d(2))=(d(1)-d(2))^2 \quad (5)$$

The integrating unit 55 then integrates the local regions if the calculated square distance D (the distance between the local regions) is smaller than a threshold but does not integrate the local regions if the square distance D is equal to or larger than the threshold.

Figure 14:
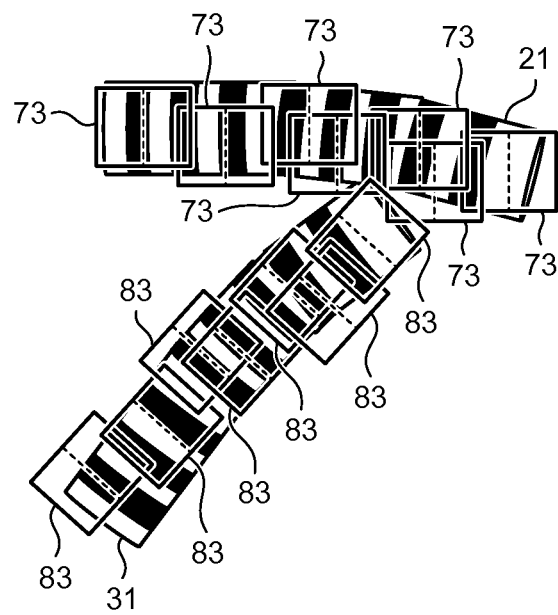
FIG. 14 is a diagram illustrating examples of integrated regions obtained by an integrating unit according to the second embodiment.

FIG. 14 is a diagram illustrating examples of the integrated regions obtained by the integrating unit 55 according to the second embodiment. In the example illustrated in FIG. 14, since two codes 21 and 31 are contained in the image acquired by the acquiring unit 11, the integrating unit 55 obtains two integrated regions, which are an integrated region obtained by integrating a plurality of local regions 73 and an integrated region obtained by integrating a plurality of local regions 83. As described above, in the second embodiment, integration of local regions of different codes can be avoided and different codes can be obtained as separate codes even when the codes are close to each other. This is because the integrating unit 55 integrates local regions with the distance therebetween, taking the distances and the directions of the local regions into account, being smaller than a threshold but does not integrate local regions with the distance therebetween being equal to or larger than the threshold.

Alternatively, the integrating unit 55 may integrate local regions with the first distance therebetween being smaller than a first threshold and the second distance therebetween being smaller than a second threshold to obtain one or more integrated regions. In other words, the integrating unit 55 may integrate the local regions if the calculated square distance D1 (first distance between local regions) is smaller than the first threshold and the calculated square distance D2 (second distance between local regions) is smaller than the second threshold but otherwise not integrate the local regions.

FIG. 15 is a flowchart illustrating an example of a flow of procedures of a reading process performed by the reader 50 according to the second embodiment.

First, the acquiring unit 11 acquires an image containing a code from the image input unit (step S201).

Subsequently, the detecting unit 53 detects a plurality of local regions containing parts of the code and the directions of the local regions from the image acquired by the acquiring unit 11 (step S203).

Subsequently, the integrating unit 55 integrates the local regions detected by the detecting unit 53 on the basis of the respective positions and directions thereof to obtain an integrated region (step S205).

Subsequently, the reading unit 17 reads the integrated region obtained by the integrating unit 55 (step S207).

As described above, in the second embodiment, since local regions with a distance therebetween, taking the distances and the directions of the local regions into account, being smaller than a threshold are integrated while local regions with the distance therebetween being equal to or larger than the threshold are not integrated, integration of local regions of different codes can be avoided and different codes can be obtained as separate codes even when the codes are close to each other.

Hardware Configuration

FIG. 16 is a block diagram illustrating an example of a hardware configuration of the reader according to the first and second embodiments described above. As illustrated in FIG. 16, the reader according to the embodiments described above includes a control device 91 such as a CPU, a storage device 92 such as a read only memory (ROM) and a random access memory (RAM), an external storage device 93 such as a hard disk drive (HDD) and a solid state drive (SSD), a display device 94 such as a display, various input devices 95 such as a digital camera and buttons, and a communication interface (I/F) 96, which can be implemented by a hardware configuration utilizing a common computer system.

Programs to be executed by the reader according to the embodiments described above are embedded on a ROM or the like in advance and provided therefrom.

Alternatively, the programs to be executed by the reader according to the embodiments described above are recorded on a computer readable recording medium such as a CD-ROM, a CD-R, a memory card, a DVD and a flexible disk (FD) in a form of a file that can be installed or executed, and provided therefrom.

Still alternatively, the programs to be executed by the reader according to the embodiments described above may be stored on a computer system connected to a network such as the Internet, and provided by being downloaded via the network. Still alternatively, the programs to be executed by the reader according to the embodiments described above may be provided or distributed through a network such as the Internet.

The programs to be executed by the reader according to the embodiments described above have modular structures for implementing the units described above on a computer system. In an actual hardware configuration, the control device 91 reads programs from the external storage device 93 and executes the programs on the storage device 92, for example, whereby the respective units described above are implemented on a computer system.

As described above, according to the embodiments described above, even distorted codes can be read.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the order in which the steps in the flowcharts in the embodiments described above are performed may be changed, a plurality of steps may be performed at the same time or the order in which the steps are performed may be changed each time the steps are performed.

What is claimed is:

1. A reader comprising:
   an acquiring unit configured to acquire a single image containing a distorted code;
   a detecting unit configured to detect a plurality of local regions containing parts of the code from the single image;
   an integrating unit configured to integrate the local regions to obtain an integrated region; and
   a reading unit configured to read the code on the integrated region, wherein
   the detecting unit further detects a position and a direction of each of the local regions, and
   the integrating unit integrates the local regions according to the positions and the directions of the local regions to obtain one or more integrated regions.

2. The reader according to claim 1, wherein
   the integrating unit calculates a main axis of the integrated region on a basis of the positions of the local regions, and
   the reading unit reads the code on the integrated region along the main axis.

3. The reader according to claim 1, wherein the integrating unit integrates the local regions according to the positions of the local regions to obtain one or more integrated regions.

4. The reader according to claim 3, wherein the integrating unit calculates a distance between local regions for each of the local regions by using a position of the local region and a position of another local region, and integrates local regions with the distance therebetween being smaller than a threshold to obtain the one or more integrated regions.

5. The reader according to claim 1, wherein the integrating unit calculates a first distance between local regions for each of the local regions by using a position of a first local region and a position of a second local region, and calculates a second distance between local regions by using the direction of the first local region and the direction of the second local region, and integrates local regions with a value based on the first distance between local regions and the second distance between local regions being smaller than a threshold to obtain the one or more integrated regions.

6. The reader according to claim 1, wherein the integrating unit calculates a first distance between local regions for each of the local regions by using a position of a first local region and a position of a second local region, and calculates a second distance between local regions by using the direction of the first local region and the direction of the second local region, and integrates local regions with the first distance between local regions being smaller than a first threshold and the second distance between local regions being smaller than a second threshold to obtain the one or more integrated regions.

7. The reader according to claim 1, wherein
   the code is a pattern in which patterns in the main axis direction are different and patterns in a direction perpendicular to the main axis direction are uniform, and
   the reading unit recognizes the pattern of the integrated region and decodes the code.

8. The reader according to claim 1, wherein the single image is acquired by one shot.

9. The reader according to claim 1, wherein the acquiring unit acquires the single image containing a distorted code from one shot taken using a camera.

10. A reading method comprising:
    acquiring a single image containing a distorted code;
    detecting a plurality of local regions containing parts of the code from the single image;
    integrating the local regions to obtain an integrated region; and
    reading the code on the integrated region, wherein
    the detecting further detects a position and a direction of each of the local regions, and
    the integrating integrates the local regions according to the position and the direction of each of the local regions to obtain one or more integrated regions.

11. A computer program product comprising a non-transitory computer readable medium including programmed instructions, wherein the instructions, when executed by a computer, cause the computer to at least:
    acquire a single image containing a distorted code;
    detect a plurality of local regions containing parts of the code from the single image;
    integrate the local regions to obtain an integrated region; and
    read the code on the integrated region, wherein
    the detecting further detects a position and a direction of each of the local regions, and
    the integrating integrates the local regions according to the position and the direction of each of the local regions to obtain one or more integrated regions.

* * * * *